United States Patent Office 3,466,169
Patented Sept. 9, 1969

3,466,169
PROCESS FOR THE PRODUCTION OF METALLIC CHLORIDES FROM SUBSTANCES CONTAINING METALLIC OXIDES
Rudolf Nowak, Frankfurt am Main-Oberrad, and Wilhelm Schuster, Frankfurt am Main, Germany, assignors to Halomet AG, Basel, Switzerland
No Drawing. Continuation-in-part of application Ser. No. 133,086, Aug. 22, 1961. This application Dec. 22, 1965, Ser. No. 515,733
Claims priority, application Germany, Dec. 31, 1964, H 54,733
Int. Cl. C22b 5/16; C01b 7/00
U.S. Cl. 75—112     11 Claims

ABSTRACT OF THE DISCLOSURE

Ore is chlorinated in the presence of coke. The amount of chlorine is limited to the stoichiometric amount needed to form the chloride of the metal of greatest chloride forming affinity. The temperature is held above the vaporization point of the resulting chloride. This removes all the metal of greatest chloride-forming affinity from the ore. The resulting chloride gas, along with any chloride impurities formed, is passed over new ore which is free of carbon, at which time chloride impurities are removed in favor of additional chloride of the metal of greatest chloride forming affinity in order to yield pure chloride of the metal of greatest chloride forming affinity. This pure metal chloride may be reduced to yield metal in the zero valence state and the ore that is then free of all of the metal of greatest chloride forming affinity can be treated similarly for collection of the chloride of the metal of next greatest chloride forming affinity.

---

The present application is a continuation-in-part application to copending parent application Ser. No. 133,086, filed Aug. 22. 1961, now U.S. Patent No. 3,244,509, patened Apr. 5, 1966, to the inventors, for a "Halide Process for Extraction of Iron From Iron-Oxide-Bearing Materials," and the priority dates to which the parent application is entitled are claimed for all subject matter common therewith.

The invention relates in general to a process for the production of pure metal chlorides from ore, roasted pyrites, minerals, slag and other substances containing metallic oxides, which are hereinafter referred to as ore.

More specifically, this invention is concerned with a halogenide-metallurgical process utilizing a novel combination of reducing-oxidizing chlorination steps.

For the production of pure iron chloride, it is known to react chlorine and ion ore, in a counter-current process, at suitable temperatures. In a reducing chlorination step thereof, carbon-containing reducing agent is mixed with chlorine and iron ore. Iron chloride and other chlorides formed in the reducing chlorination step are subsequently mixed with new ore in an oxidizing chlorination step to remove substantially all chlorides but iron chloride. This process, based on the principle of combining the reducing and the oxidizing-chlorination steps, has become known in the art as the "Halomet Process." However, not all ores can be satisfactorily purified with the Halomet process. For example, when employing an oxidic ore having 25% Sn and 20% Fe, there was obtained, in place of the desired pure ferric chloride, a mixture of tin tetrachloride and ferric chloride, although the quantity of chlorine employed in the chlorination process corresponded stoichiometrically to the quantity of iron present. Upon examination of this process, it was found that the tin was completely chlorinated, but that a substantial portion of the iron remained in the charged ore. Therefore, the following reaction took place in the ore free of a reducing agent:

$$4FeCl_3(g) + 3SnO_2(s) = 2Fe_2O_3(s) + 3SnCl_4(g)$$

When the quantity of chlorine was chosen to correspond stoichiometrically to the tin content of the ore, there was only obtained, as the gaseous final product, pure tin tetrachloride ($SnCl_4$). Consequently, it follows that the tin has a greater chloride-forming affinity than iron. In this connection, the expression "chloride-forming affinity" of an element is understood to mean the difference between the free energy of the chloride and the oxide (or oxychloride) at the chlorination temperature and also refers to gaseous chlorides, gaseous oxychlorides, and solid oxides. The chloride-forming affinity of various elements can be calculated from thermodynamic considerations or determined experimentally.

In further tests, it was found that the elements can be grouped, with respect to their chloride-forming affinity, into a definite series, for example at a chlorination temperature of: 1300° C.: Cu, Pb, Zn, Co, Ni, Sn, Fe, Ti, Ge, Al, Si, V, P, S; 800° C.: Pb, Cu, Zn, Co, Sn, Ni, Fe, Ti, Ge, Al, Si, S, V, P.

Since the chloride-forming affinity differs for the various metals in an iron oxide containing material, it is apparent that treatment thereof in a Halomet process does not result in pure ferric chloride. To obtain pure ferric chloride from ores, it is necessary that the iron present has a greater chloride-forming affinity than any other metal in the ore.

It is therefore a principal object of the present invention to provide an improved process of chlorinating an ore containing a plurality of metal oxides to produce pure metal chlorides therefrom.

It is another object of the invention to provide an improved process of chlorinating one of a group of metal oxides in intimate relation with one another.

It is yet another object of the invention to provide an improved process of selectively chlorinating one of a plurality of metal oxides to obtain a pure gaseous metal chloride.

Still another object of the invention is to provide an improved process of selectively and successively chlorinating the different metal oxides in admixture to obtain the corresponding individual pure metal chlorides thereof.

It was discovered that chlorinating an ore, one or more times, in a reducing-oxidizing environment and regulating the added quantity of chlorine to correspond stoichiometrically to the metal having the greatest chloride-forming affinity will result in the selective chlorination of the latter metal. By repeating the process, the various metal oxides making up the ore are selectively chlorinated and removed in gaseous form from the solid ore.

The manner in which the chloride-forming series is experimentally determined is best described by reference to Example 1.

In the production of pure metal chlorides from oxidic ores, the process is conducted according to the invention as follows: The ore is chlorinated several times according to the Halomet Process, and during each individual chlorination step, the quantity of chlorine charged corresponds stoichiometrically to the proportion of the metal having the greatest chloride-forming affinity.

When the desired metal in an ore has a low chloride-forming affinity and the undesired metals in admixture therewith are present in only small quantities and have a greater chloride forming affinity than that of the desired metal it is usually not economical to process the undesired metals individually. In such instances the quantity of chlorine charged during a first reducing-oxidizing chlorination step is regulated to correspond stoichiometrically to the total quantity of the metals having the greater chloride-forming affinity which are chlorinated jointly and volatilized as metal chlorides. From the unchlorinated residue remaining from the first reducing-oxidizing chlorination step, there is then produced, during a second reducing-oxidizing chlorination step, the chloride of the desired metal having the lesser chloride-forming affinity.

If either the reducing agents or the ore contain hydrogen, vanadium or phosphorus, the quantity of chlorine to be used is increased correspondingly in a stoichiometric manner because of the unavoidable formation of HCl, $VOCl_3$, and $POCl_3$. Thus, while the chloride-forming affinity of vanadium and phosphorus is very small, these elements have a very great propensity to form gaseous oxychlorides. Consequently, if P and V are for some reason present, $POCl_3$ and $VOCl_3$ are formed already in the first reducing-oxidizing chlorination. They are formed together with the desired metal chloride or chlorides. However, by cooling of the gaseous chlorination product, the oxychlorides remain in the gaseous state together with other constituents ($CO_2$, CO, HCl, $SO_2$, etc.) at a temperature at which the desired metal chloride or chlorides may be separated in solid or liquid form.

The present process has the further advantage that it is also possible to utilize poor-quality and low-percentage ores. Moreover, when separately producing several pure metal chlorides, the drying, comminution and heating of the ore is required only once at the beginning of the process.

Analyses of the metal chlorides produced in accordance with the invention reveals that minor traces of foreign chlorides are present in only few cases. For example, $TiCl_4$ obtained in accordance with the invention contained 0.3% by weight of $AlCl_3$, and traces of $FeCl_3$, while $GeCl_4$ product contained only 0.01% by weight of $AlCl_3$. The trace amounts of foreign chlorides can be removed from the product, according to a further aspect of the invention by adsorption on active surfaces (for example active charcoal, silica gel, molecular sieves). Satisfactory removal of the trace amounts of impurities is achieved under optimal adsorption conditions, which conditions are dependent upon the partial pressures, vapor tensions, boiling points, and sizes of the molecules being adsorbed.

In the operation of the process, the dry pulverized ore is introduced into an oxidation-chlorination chamber, and thereafter into a reduction-chlorination chamber where pulverized reducing agent is admixed with the ore. Gaseous chlorine contacts the ore in the reduction chlorination chamber whereby to form a mixture of gaseous chlorides. The mixture of chlorine and gaseous metal chlorides then flows back through the oxidation-chlorination chamber wherein exchange reactions take place, such as, for example:

$4FeCl_3(g) + 3SnO_2(s) = 2Fe_2O_3(s) + 3SnCl_4(g)$
(when producing tin), or
$2AlCl_3(g) + Fe_2O_3(s) = Al_2O_3(s) + 2FeCl_3(g)$
(when producing iron), or
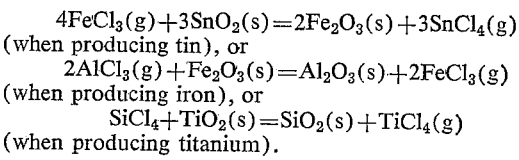
(when producing titanium).

In the combination chlorination process of this invention, importance is attributed to the stoichiometrically correct dosing of the chlorine in each reducing-oxidizing chlorination step. The quantity of chlorine charged into the reduction chlorination chamber corresponds stoichiometrically to the content of that metal or metals in the ore whose chloride or chlorides are to be produced, as well as to the content of very ignoble elements which are converted into volatile oxychlorides, such as, for example, V and P.

If too little chlorine is employed during the chlorination, a proportion of the metal to be chlorinated remains in the solid residue. When too much chlorine is used, there is produced, in addition to the desired metal chloride, an additional metal chloride which must be re-oxidized in the oxidation-chlorination chamber to solid oxide thereof. The correct charge of chlorine to the process is conventionally attained by automatic measuring, controlling, and regulating the flow thereof.

If, for example, titanomagnetite ore is treated in accordance with the method of this invention for the production of titanium, there is obtained during the first reducing-oxidizing chlorination at about 700° C. Ferric chloride, as a waste product. The resulting iron-free residue from the first reducing-oxidizing chlorination step which is enriched in titanium oxide is treated in a second reducing-oxidizing chlorination. It is again contacted with chlorine gas in the presence of a carbon-containing reducing agent, whereby the following reactions take place at, for example 900° C. (reducing chlorination).

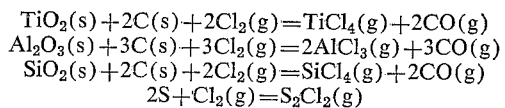

The nonferrous metal oxides present in the iron-free charge are thus reacted to form the corresponding chlorides in the presence of carbon and chlorine. If the resulting gaseous chlorides are combined with the carbon-free charge from the first reducing-oxidizing chlorination step, the following reactions take place (oxidizing chlorination):

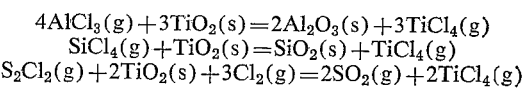

Thus, upon contacting the carbon-free charge from the first reducing-oxidizing chlorination step with the gaseous chlorides of metals having lower chloride forming affinity, than the iron, these chlorides are re-oxidized to solid oxides of metals which have a lesser chloride-forming affinity than the titanium. Therefore, during the second reducing-oxidizing chlorination step, pure $TiCl_4$ is obtained.

The solid residue remaining after the titanomagnetite has been treated is free of iron and titanium; and contains enriched $SiO_2$ and $Al_2O_3$. This residue can again be treated in the same manner as the residue obtained from the titnaomagnetite chlorination. During this third reducing-oxidizing chlorination step, the following reactions occur:

Reducing chlorination (for example 850° C.):

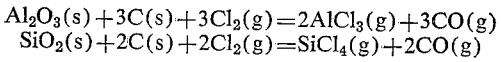

Oxidizing chlorination (for example 1000° C.):

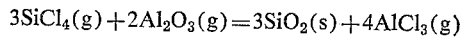

The remaining residue, which is now free of aluminum, contains only heavy metal chlorides and the chlorides of metals, alkali, and alkaline earth metals having a low chloride-forming affinity, as well as, for example, manganese, nickel, chromium, cobalt, sodium, potassium, calcium, magnesium, and barium. In order to separate valuable metals without losing excessive quantities of chlorine, the residue is advantageously treated with a hydrochloric acid solution to solubilize and leach out said chlorides. The resulting acid solution is then separated from the insoluble remainder of the residue acid, the metals in solution are precipitated as hydroxides with sodium or potassium hydroxide, and separated. From this alkaline solution, the carbonates of the alkaline earth metals and magnesium are precipitated with $CO_2$ (preferably derived from the waste gas of the present process) and are separated from the thus-produced alkali chloride solution, and the remaining clear solution is electrolyzed to form the alkaline base, chlorine, and hydrogen. It is particularly economical to employ an alkali solution in the cycle to precipitate the dissolved metals as hydroxides and to use the chlorine gas liberated by electrolysis again in the chlorination.

If the solid carbon-containing reducing agent in the chlorination process is coke obtained from anthracite, bitumious coal, brown coal, turf (peat) charcoal, or petroleum coke from petroleum or natural gas, there is also a small amount of hydrogen therein. Therefore an equivalent amount of hydrogen chloride gas produced from the hydrogen in the coke discharges with the gaseous chlorination product.

According to the invention, the chlorine bound in the gaseous HCl is recovered by washing the evolved gases, after the condensation and separation of the metal chloride or metal chlorides therefrom, with water in a conventional manner. The resulting hydrochloric acid solution is then electrolytically decomposed into $Cl_2$ and $H_2$. The chlorine is advantageously reused in the chlorination process. It is particularly advantageous to use the aqueous hydrochloric acid solution to treat the last solid chlorination residue thereby, eliminating the step of recovering the chlorine therefrom by electrolysis.

Since many of the chlorination reactions are strongly exothermic, the released heat causes a considerable increase in the reaction temperature. According to the invention, the reaction temperature during the chlorination process is controlled by either admixing with the ores, before the chlorination thereof, a cold, solid substance which does not participate chemically in the reaction (preferably chlorination residues), or else by adding these substances to the reaction mixture during the chlorination (solid gas mixture).

In this way the heat capacity of the reaction mixture is enlarged, while the amount of released heat remains the same.

The production of pure metal chlorides according to the invention makes it possible to produce pure oxides of these same metals by treating the chlorides with $O_2$-containing gases. In this latter process, chlorine gas is liberated which can advantageously be recycled to the chlorination step.

However, it is also possible to produce pure metals from their pure chlorides in a conventional manner directly or by electrolysis or by reduction of the oxides thereof. The greatly simplified and economical production of pure metal chlorides according to the invention results in lower production costs for the pure oxides or metals manufactured therefrom.

In order to further illustrate and exemplify the various aspects of this invention the examples which follow will clarify in more detail the process parameters of the present novel process.

EXAMPLE 1

The chemical analysis of a dehydrated bauxite yields, for example, the following data: 63% $Al_2O_3$, 28% $Fe_2O_3$, 4% $TiO_2$, 1% ZnO, and 4% $SiO_2$.

There are first mixed together approximately equal proportions of artificially produced granular oxides having a particle size of about 1 mm., i.e., respectively 20% by weight of $Al_2O_3$, $Fe_2O_3$, $TiO_2$, ZnO, and $SiO_2$. About 5 wt. percent of this mixture is separated and admixed with granular charcoal having a particle size of 1 mm., in the approximate weight proportion of 1:1. Thereafter, the charcoal-containing and the charcoal-free mixtures are charged one after the other, into a tube of magnesium spinel ($MgO \cdot Al_2O_3$) having an inside diameter of about 3 cm. The tube is then heated in an electric furnace, in an atmosphere of pure nitrogen or argon, to a reaction temperature which is above the vaporization temperature of the highest-boiling chloride present in the particular ore. However, this reaction temperature, owing to the kinetics of the ensuing reaction, is not lower than 700° C. The approximate evaporation temperatures of the resulting chlorides are for $SiCl_4$: 58° C.; for $ZnCl_2$: 732° C.; for $TiCl_4$: 136° C.; for $AlCl_3$: 180° C.; and for $FeCl_3$: 320° C. Thus, the reaction temperature must be higher than 732° C., and preferably 800° C. When this temperature is attained, chlorine is introduced into the magnesium spinel tube, at a velocity of about 1 cm. per second (measured at the reaction temperature with the tube vacant).

The chlorine first flows through the oxide mixture containing charcoal where a reducing chlorination taking place. During this step, the gaseous chlorides $SiCl_4$, $AlCl_3$, $FeCl_3$, $TiCl_4$, and $ZnCl_2$ are produced. These chlorides are then passed through the oxide mixture free of carbon, where all but the chloride endowed with the greatest chloride-forming affinity are reoxidized to solid oxides (oxidizing chlorination).

Consequently, it is only necessary to analyze the chloride condensing in the cool end of the magnesium spinel tube, or the gaseous chloride effluent from the end of the tube. In this example, a white sublimate of $ZnCl_2$ is detected in the end of the tube. Thus, among the elements present in the ore (Si, Ti, Al, Fe, and Zn), the zinc has the greatest chloride-forming affinity.

During the impingement of the gaseous chlorides upon the oxide particles free from carbon, the following reactions take place, inter alia:

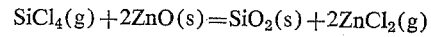
$SiCl_4(g) + 2ZnO(s) = SiO_2(s) + 2ZnCl_2(g)$

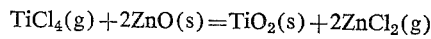
$TiCl_4(g) + 2ZnO(s) = TiO_2(s) + 2ZnCl_2(g)$

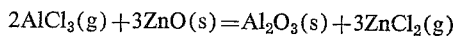
$2AlCl_3(g) + 3ZnO(s) = Al_2O_3(s) + 3ZnCl_2(g)$

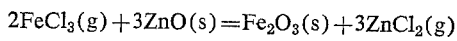
$2FeCl_3(g) + 3ZnO(s) = Fe_2O_3(s) + 3ZnCl_2(g)$

Subsequently, a second test is conducted in the same manner, but leaving out the ZnO from the oxide mixtures. The reaction temperature is 700° C. A reddish brown sublimate of $Fe_2Cl_6$ is found in the end of the tube. This means that, among the elements Si, Ti, Al, and Fe, the iron has the greatest chloride-forming affinity.

During the impingement of the gaseous chlorides upon the oxide particles which are free from carbon, the following reactions take place, inter alia:

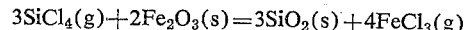
$3SiCl_4(g) + 2Fe_2O_3(s) = 3SiO_2(s) + 4FeCl_3(g)$
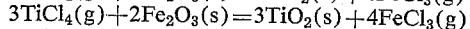
$3TiCl_4(g) + 2Fe_2O_3(s) = 3TiO_2(s) + 4FeCl_3(g)$
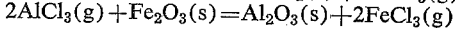
$2AlCl_3(g) + Fe_2O_3(s) = Al_2O_3(s) + 2FeCl_3(g)$ In the same manner, a third test is then carried out wherein the oxide mixtures now contain only $SiO_2$, $TiO_2$, and $Al_2O_3$. The gaseous chloride discharging from the tube is $TiCl_4$. The reactions in the portion of oxides free from carbon are, inter alia:

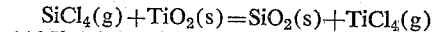
$SiCl_4(g) + TiO_2(s) = SiO_2(s) + TiCl_4(g)$
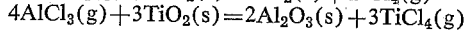
$4AlCl_3(g) + 3TiO_2(s) = 2Al_2O_3(s) + 3TiCl_4(g)$ In a fourth test, a mixture of $SiO_2$ and $Al_2O_3$ is employed. As the resulting sublimate, $Al_2Cl_6$ is found. This compound is produced according to the following reaction equations:

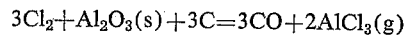
$3Cl_2 + Al_2O_3(s) + 3C = 3CO + 2AlCl_3(g)$ in the charcoal-containing portion, and

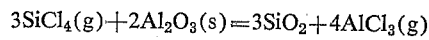
$3SiCl_4(g) + 2Al_2O_3(s) = 3SiO_2 + 4AlCl_3(g)$ in the portion free from charcoal.

Finally, among the examined elements, silicon remains as having the smallest chloride-forming affinity.

The affinity series for the ore to be processed in accordance with the invention evolves from the test results as follows: Zn, Fe, Ti, Al, Si.

EXAMPLE 2

From a tin oxide ore concentrate containing 25% Sn, 20% Fe, and the remainder being quartz and alumina silicates, pure tin and, as a by-product, pure ferric chloride are produced as follows:

First reducing-oxidizing chlorination

The granulated ore concentrate is dehydrated at 800° C., cooled, and then introduced into a chlorination apparatus. The ore enters the oxidation-chlorination chamber where it is contacted in counter-current relation at a temperature of 650° C., with a gaseous mixture of $FeCl_3$, $SiCl_4$, $AlCl_3$, $SnCl_4$, CO, $CO_2$, and HCl coming from the reduction-chlorination chamber. During this first process, CO is oxidized to $CO_2$, and the metal chlorides of $FeCl_3$, $SiCl_4$, and $AlCl_3$ are oxidized to the solid oxides $Fe_2O_3$, $SiO_2$, and $Al_2O_3$. The $SnO_2$ contained in the ore acting as an oxidation agent in the latter reaction is itself chlorinated to $SnCl_4$.

The resulting product, consisting of $SnCl_4$, $CO_2$, and HCl leaves the oxidation-chlorination chamber at a temperature of 150° C., while the partially chlorinated ore and the produced oxides enter the reduction-chlorination chamber, where they are admixed with pulverized high-temperature petroleum coke. The mixture of solids react therein at 400° C. with chlorine in counterflow relation and the $SnO_2$ contained in the ore is completely chlorinated to $SnCl_4$, while the accompanying substances are partially chlorinated to $FeCl_3$, $AlCl_3$, and $SiCl_4$. These gaseous chlorides flow, mixed with HCl (from the hydrogen of the petroleum coke), CO, and $CO_2$, into the oxidation-chlorination chamber. The added quantity of chlorine corresponds stoichiometrically to the content of tin in the ore concentrate and to the content of hydrogen in the petroleum coke.

Second reducing-oxidizing chlorination

The tin-free charge after the first reducing oxidizing chlorination leaving the reduction-chlorination chamber, is cooled, and again subjected to the same treatment, pure $FeCl_3$ being obtained whereby the added quantity of chlorine in this case corresponds stoichiometrically to the content of iron in the ore concentrate and to the hydrogen content in the petroleum coke.

In the $SnCl_4$-containing gas from the first chlorination step, traces of $FeCl_3$ therein are removed by adsorption with the aid of a large-pore silica gel at 95° C. The gaseous $SnCl_4$ is then condensed by cooling the residual gas to —20° C., and the precipitate is burned with 90% technical oxygen at 650° C. to form solid $SnO_2$ and $Cl_2$. The $Cl_2$ is separated from the $SnO_2$, cooled, and recycled to the chlorination step, while the $SnO_2$ is reduced to pure tin at 600° C. with water gas produced from petroleum and air. All of the above reactions are conducted as dust-gas reactions in cyclone batteries. In order to control the chlorination temperature, the exothermic heat liberated during the chlorination is absorbed by a cold, tin-free charge blown into the reaction chamber during the process.

EXAMPLE 3

From iron oxide-containing clay, aluminum chloride, $Fe_2O_3$ pigment, and $SiCl_4$ are produced in pure form.

First reducing-oxidizing chlorination

In this process, the finely ground clay, dehydrated at 850° C. and cooled to 50° C. is introduced into a chlorination apparatus while chlorine corresponding to the amount of Fe and H introduced is blown into the apparatus counter-current thereto. At about the middle of the path through the chlorination apparatus, finely-ground high-temperature brown coal coke is added to the ore. The carbon-containing mixture of solids then reacts at 750° C. with the chlorine in the reduction-chlorination chamber, forming gaseous $FeCl_3$, $AlCl_3$, $SiCl_4$, CO, $CO_2$, HCl, and $S_2Cl_2$. The iron-free solid residue discharged from the chlorination apparatus contains small quantities of solid $CaCl_2$ and $MgCl_2$.

This gaseous effluent from the reduction-chlorination chamber is contacted in the oxidation-chlorination chamber with fresh, dried clay, at 750° C. and the CO is oxidized to $CO_2$, $S_2Cl_2$ to $SO_2$, and $AlCl_3$ to solid $Al_2O_3$ and $SiCl_4$ to $SiO_2$ by the $Fe_2O_3$ in the clay, which is partially converted to $FeCl_3$. While the clay which has been partially chlorinated is conveyed, together with the resulting oxides and the added coke dust, to the reduction-chlorination chamber the gaseous chlorination product, consisting of $FeCl_3$, $CO_2$, HCl, and $SO_2$, leaves the chlorination apparatus at 350° C. This mixture is cooled to 50° C. The condensed $Fe_2Cl_6$ is separated from the residual gas and oxidized to form pure $Fe_2O_3$ pigment. The chlorine which is liberated by this oxidation is recycled to the chlorination stage.

Second reducing-oxidizing chlorination

The ion-free residue from the first reducing-oxidizing chlorination step is again chlorinated as in the above described first reducing-oxidizing chlorination step, but by an amount of chlorine corresponding to the amount of Al and H introduced in the reduction-chlorination chamber used in the second reducing-oxidizing chlorination step (at 800° C.), there are produced gaseous $AlCl_3$, $SiCl_4$, CO, $CO_2$, HCl, and $S_2Cl_2$ which react in the oxidation-chlorination chamber with the iron-free carbon-free residue to form solid $SiO_2$ and gaseous $SO_2$. The gaseous mixture leaving oxidation-chlorination chamber consists of $AlCl_3$, CO, $CO_2$, HCl, and $SO_2$. From this gaseous chlorination product, there is separated, by cooling to 50° C., pure $Al_2Cl_6$ in solid form.

Third reducing-oxidizing chlorination

The iron-and aluminum-free residue from the second reducing-oxidizing chlorination is similarly chlorinated in a third reducing-oxidizing chlorination step. The amount of chlorine introduced in the reduction chlorination chamber corresponds to the amount of Si, and H, in the residue and the brown coal coke. In the reduction-chlorination chamber operating at 700° C., there are produced gaseous $SiCl_4$, CO, $CO_2$, HCl, and $S_2Cl_2$. $S_2Cl_2$ is thereafter oxidized in the oxidation-chlorination chamber operating at 700° C. with carbon-free residue from the second chlorination to $SO_2$. The gaseous mixture leaving this third reducing-oxidizing chlorination apparatus consists of $SiCl_4$, CO, $CO_2$, HCl, and $SO_2$ wherefrom $SiCl_4$ is separated in liquid form by condensation. The solid residue from the third reducing-oxidizing chlorination consists of a mixture of alkali and alkaline earth metal oxides containing a small amount of $CaCl_2$ and $MgCl_2$.

The residual gases from which $FeCl_3$, $AlCl_3$, and $SiCl_4$ are precipitated also contain hydrogen chloride which is removed by absorption with water. The resultant gas mixture (CO, $CO_2$, and $SO_2$) is discarded. The obtained hydrochloric acid is split electrolytically into $H_2$ and $Cl_2$, the latter being recycled to the chlorination stage.

The residue from the third reducing-oxidizing chlorination is washed with water to dissolve, $CaCl_2$ and $MgCl_2$, and the resulting chloride solution is then separated from the insoluble matter.

With solution of sodium hydroxide and $CO_2$ (from the waste gas of the chlorination process), $CaCO_3$ and $MgCO_3$ are precipitated, NaCl solution being obtained. After the carbonates have been separated, the clear NaCl solution is electrolytically treated to obtain NaOH, $H_2$, and $Cl_2$. The solution of sodium hydroxide is employed for precipitating the carbonate, and the chlorine is recycled to the chlorination stage.

EXAMPLE 4

In a tower constructed of magnesium spinel and containing two fluidized beds, a mixture of anhydrous oxides: PbO, ZnO, $SnO_2$, $Fe_3O_4$, $TiO_2$, $GeO_2$, $Al_2O_3$, $SiO_2$, $V_2O_5$, and $Ca_3(PO_4)_2$ was processed according to the present invention. The mixture was divided into two portions. One portion was mixed with dried coke particles and charged into the lower fluidized bed, while the other portion was charged into the upper fluidized bed. The tower was heated with hot combustion gases which pass from the bottom to the top thereof at a temperature of 930° C., and then chlorine was blown into the tower in place of the combustion gas. The reduction-chlorination was conducted in the lower fluidized bed, the oxidation-chlorination was carred out in the upper fluidized bed. The gaseous mixture escaped from the top of the tower was continuously analyzed. This gaseous mixture consisted of $PbCl_2$, $CO_2$, CO, $SO_2$, $POCl_3$, $VOCl_3$ and HCl. When $ZnCl_2$ appeared as the first impurity, the test was terminated. $PbCl_2$ was condensed and separted from the gas mixture by cooling the same and then steam was added to the resulting lead-free gas at 120° C. During this step, there was produced a suspension of pure $V_2O_5$ in pure phosphoric acid, and a waste gas consisting of $CO_2$, $SO_2$, and HCl. The orange-colored $V_2O_5$ was separated from the phospheric acid in a centrifuge.

The fluidized-beds were charged with the original mixture of anhydrous oxides from which PbO, $Ca_3(PO_4)_2$, and $V_2O_5$ were absent. The reaction temperature was maintained at 1150° C. and the gaseous reaction product consisted of $ZnCl_2$, $CO_2$, CO, $SO_2$, and HCl. When $SnCl_4$ appeared as the impurity in the gaseous effluent, the test was terminated.

During the next charge, PbO, $Ca_3(PO_4)_2$, $V_2O_5$, and ZnO were omitted. The reaction temperature was maintained at 1080° C. and the baseous reaction product contained $SnCl_4$, $CO_2$, CO, $SO_2$ and HCl. When $FeCl_3$ appeared as the impurity, the reaction was terminated.

In a subsequent chlorination at 700° C. wherein the feed lacked PbO, ZnO, $Ca_3(PO_4)_2$, $V_2O_5$, and $SnO_2$ there was obtained gaseous $FeCl_3$ in addition to $CO_2$, CO, $SO_2$ and HCl. This reaction was terminated when $TiCl_4$ first appeared as an impurity in the effluent.

The resulting oxide mixture lacking PbO, ZnO, $SnO_2$, $Fe_3O_4$, $Ca_3(PO_4)_2$, and $V_2O_5$ was chlorinated at 600° C. Only $TiCl_4$, $CO_2$, CO, $SO_2$ and HCl were found in the gaseous effluent therefrom. As the first impurity, $GeCl_4$ appeared.

When the feed charged to the fluidized beds lacked PbO, ZnO, $SnO_2$, $Fe_3O_4$, $TiO_2$, $Ca_3(PO_4)_2$, and $V_2O_5$, there were present in the reaction gas, at a reaction temperature of 480° C., $GeCl_4$, $CO_2$, CO, $SO_2$, and HCl, in addition to traces of $AlCl_3$ This gas was cooled to 100° C. and passed, at this temperature, through a column of active charcoal to remove traces of $AlCl_3$ from the gas. Subsequently, pure $GeCl_4$ was obtained by condensation.

EXAMPLE 5

From a residue of the production of tin ore concentrate pure clorides of iron are produced. The oxidic residue contains 1% Sn, 50% Fe, silicates, quartz, and alumina silicates. The chloride-forming affinity series in the present case is Sn, Fe, Al, Si. Since the production of tin tetrachloride is uneconomical, the chlorine used in the chlorination of the residue corresponds stoichiometrically to that quantity required to form $SnCl_4$, and $FeCl_3$, in total. During the chlorination step, a mixture of $SnCl_4$, $FeCl_3$, and $CO_2$ is produced as a gaseous product, in addition to small portions of HCl and $SO_2$, while Al and Si remain in the solid residue.

In separating the pure $FeCl_3$ from the gaseous chlorination product by cooling the same, the $SnCl_4$ remains in the residual gas because of its very small partial pressure. During the subsequent absorption of the hydrogen chloride in water, the $SnCl_4$ is split hydrolytically and the chlorine forms hydrochloric acid. The entire amount of hydrochloric acid is then electrolyzed.

The by-product, pure stannic acid, is separated from the hydrochloric acid wherefrom tin is economically produced.

Any phosphoric acid and/or vanadium pentoxide present can be removed from the residual gas remaining after the condensation and separation of a metal chloride or chlorides therefrom. Water or steam is added to this residual gas at a temperature between 110 and 140° C.; and the resulting mist of phosphoric acid and/or vanadium pentoxide are absorbed in hot phosphoric acid, and the solid vanadium pentoxide is mechanically separated from the phosphoric acid.

In order to optimize the above-described process, it is desirable to add substances containing phosphorus and/or vanadium to the ore before the chlorination thereof.

It is also particularly advantageous to crush the ores and the reducing material to fine dust before treating them according to the invention. Especially advantageous is to carry out the above process in continuous manner by treating the finely-divided solids countercurrent to the gases in suitable devices, e.g., in cyclone batteries, in known manner. This modification of the process according to the invention yields an economic optimum. There is thorough mixture of gases and solids, heat transfer between both is exceptionally high, the mixture can be cooled quickly, and with high gas velocities and finely-divided solids having a large surface area, reaction times are very short. The process becomes essentially automatic.

The foregoing examples are exemplary only of the novel process herein and the claims appended hereto are not to be delimited thereby but are entitled to the full equivalences of the various process parameters described hereinbefore.

We claim:

1. In a process for the recovery of pure metal chlorides from an oxidic ore containing a plurality of metal oxides having different chloride forming affinities by subjecting said ore to a reduction-oxidation chlorination, wherein a first portion of said ore is heated to a temperature above the vaporization temperature of the metal chloride having the highest chloride forming the affinity, contacting a second portion of ore admixed with a solid carbonaceous reducing agent with molecular chlorine said second portion of ore being maintained above the vaporization temperature of the metal chloride having greatest chloride forming affinity passing the resulting gaseous metal chloride into intimate contact with said first portion of ore to remove trace amounts of undesired gaseous metal chlorides therefrom the improvement comprising, utilizing an amount of molecular chlorine being contacted with said second portion of ore which corresponds stoichiometrically to the amount of that metal having the greatest chloride forming affinity in said ore, to the amount of hydrogen to be present during the oxidation chlorination process and to the amount of volatile oxychloride formers present in the ore.

2. A process as claimed in claim 1 for the recovery of the chloride of a particular metal with a chloride-forming affinity less than that of said metals of greatest chloride-forming affinity, the amount of chlorine used in the steps of claim 1 corresponding stoichiometrically to the amount of those metals in the ore with chloride-forming affinities greater than that of said particular metal, the chloride of which it is to produce, the temperature used in the steps of claim 1 exceeding the vaporization point of the chloride of highest vaporation point in the group of metals having chloride forming affinities greater than that of said particular metal, further comprising the step of subjecting the ore to a second reduction-oxidation chlorination, the amount of chlorine used in the second reduction-oxidation chlorination corresponding stoichiometrically to the amount of said particular metal present in the ore, to the amount of hydrogen to be present during the second reduction-oxidation chlorination, and to the amount of volatile-oxychloride formers to be present during the second reduction-oxidation chlorination, the second reduction-oxidation being carried out at a temperature above the vaporization point of the chloride of said particular metal.

3. A process as claimed in claim 1, further comprising the steps of collecting the gaseous chloride of said metal and purifying it by passing it through an activated material selected from the group consisting of activated carbon, silica gel, and molecular sieves.

4. A process as claimed in claim 1, the ore and the reducing material being in a finely divided state.

5. A process as claimed in claim 1, wherein the reduction-oxidation chlorination is exothermic, further comprising the step of mixing cold, inert, solid materials with the ore to control the reaction temperature.

6. A process as claimed in claim 1, wherein the ore residue of the reduction-oxidation chlorination contains heavy chlorides, further comprising the steps of dissolving the heavy chlorides with a solvent chosen from the group consisting of water and aqueous hydrochloric acid, adding an alkali metal hydroxide to the resulting chloride solution to render the solution alkaline, collecting precipitated hydroxides, treating the remaining alkaline solution with carbon dioxide, collecting precipitated carbonates, decomposing the resulting solution into a solution of alkali metal hydroxide, chlorine and hydrogen, whereby alkali metal hydroxide solution is made available for further hydroxide precipitation and chlorine is made available for further reduction-oxidation chlorinations.

7. A process as claimed in claim 1, wherein the ore contains at least one element chosen from the group consisting of phosphorus and vanadium, further comprising the steps of collecting the gases from the reduction-oxidation chlorination, condensing and separating the resulting metal chlorides, mixing the remaining gas at a temperature of between 110 and 140° C. with material chosen from the group consisting of water and steam, and mechanically removing any vanadium pentoxide from the resulting solution.

8. A process as claimed in claim 7, further comprising the step of adding a compound chosen from the group consisting of vanadium compounds and phosphorus compounds to the ore before the reduction-oxidation chlorination.

9. A process as claimed in claim 4, wherein the reduction-oxidation chlorination is carried out in dust-gas reactions in cyclone batteries.

10. A process as claimed in claim 1, further comprising the steps of collecting the chloride of said metal, oxidizing the chloride by oxidation with oxygen-containing gases and collecting chlorine obtained in the step of oxidizing, whereby the chlorine may be used further for performing reduction-oxidation chlorinations.

11. A process as claimed in claim 1, further comprising the steps of collecting the chloride of said metal and treating the chloride to produce the metal in the zero valence state.

References Cited

UNITED STATES PATENTS

| 3,244,509 | 4/1966  | Nowak et al. | 75—112 |
| 3,158,579 | 11/1964 | Pollitzer et al. | 252—455 |
| 3,050,363 | 8/1962  | Veal | 252—449 |
| 2,752,301 | 6/1956  | Cooper | 75—113 |
| 2,055,613 | 9/1936  | Sessions | 75—113 |

L. DEWAYNE RUTLEDGE, Primary Examiner

T. R. FRYE, Assistant Examiner

U.S. Cl. X.R.

23—51; 75—113, 121